No. 739,684. Patented September 22, 1903.

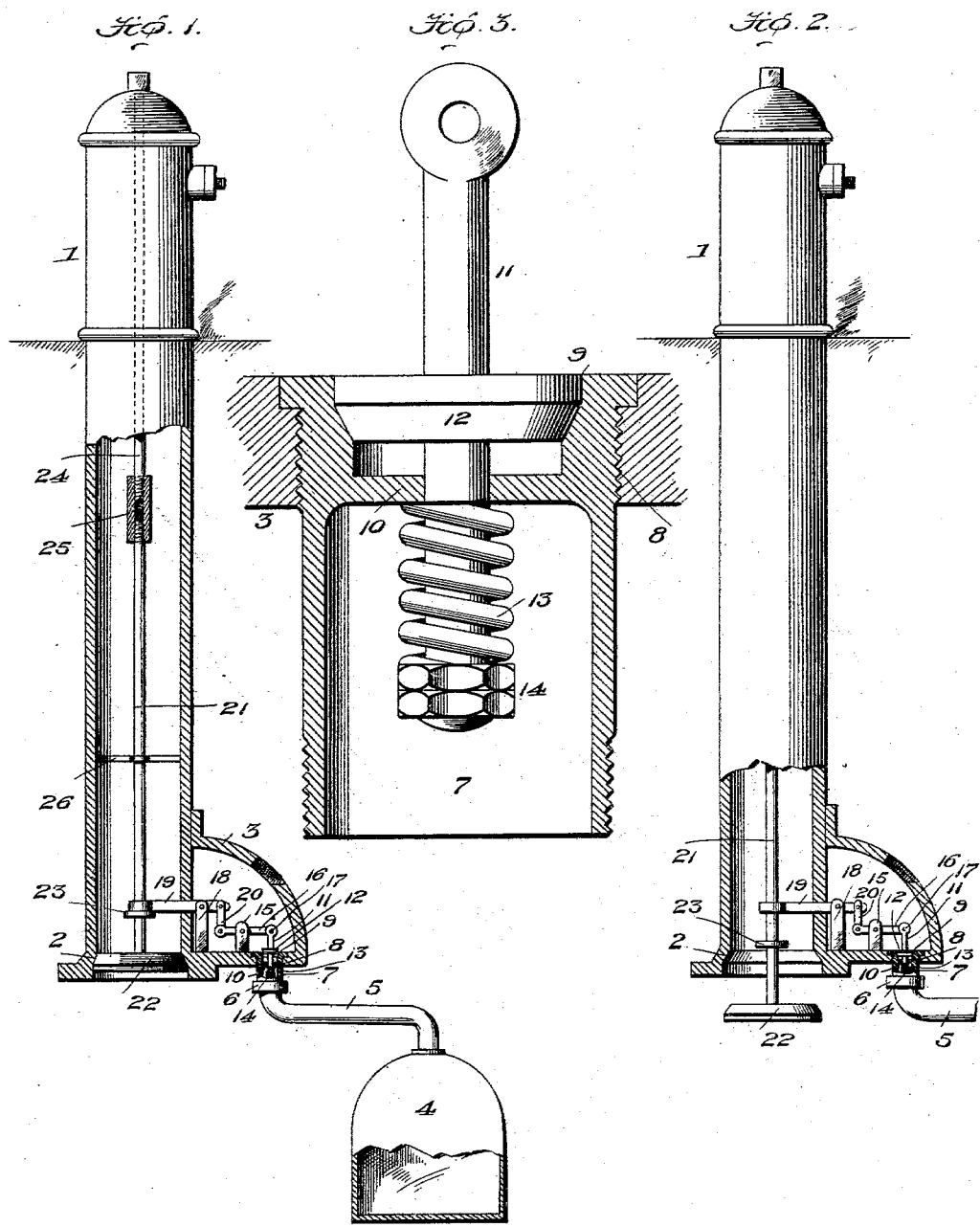

UNITED STATES PATENT OFFICE.

JOHN F. KEHR, OF TRENTON, NEW JERSEY.

ANTIFREEZING FIRE-PLUG.

SPECIFICATION forming part of Letters Patent No. 739,684, dated September 22, 1903.

Application filed November 14, 1902. Serial No. 131,313. (No model.)

*To all whom it may concern:*

Be it known that I, JOHN F. KEHR, a citizen of the United States, residing at Trenton, county of Mercer, and State of New Jersey, have invented certain new and useful Improvements in Antifreezing Fire-Plugs, of which the following is a specification.

My invention relates to fire-plugs, and more particularly to such as are intended to prevent freezing of the contained water.

The object of the present invention is the provision of a fire-plug with a novel arrangement of waste-valve and drain-pipe whereby the waste-valve will be unseated when the inlet-valve is closed to permit draining of the water from the plug, but adapted to automatically seat on opening of the inlet-valve; and to this end the invention consists of certain improved features and novel combinations of parts set forth in detail hereinafter.

In the accompanying drawings, Figure 1 is a sectional elevation of the invention, showing the inlet-valve closed and the waste-valve open; Fig. 2, a similar view, but showing the inlet-valve open and the waste-valve closed; and Fig. 3, a detail of the waste-valve construction.

The numeral 1 designates the casing of the plug, which is provided at its bottom with inlet-valve seat 2 and at its side with a boxing 3.

The numeral 4 designates a terra-cotta cesspool, to which pipe 5 leads from a coupling 6, joining it to a spud 7, which is of tubular form and screwed into the bottom of the boxing 3 at 8, the same being provided with waste-valve seat 9 and a guide 10 for the waste-valve stem 11 of waste-valve 12. On the waste-valve stem 11, below the guide 10, is coil-spring 13, which is adjustably held by the nuts 14, whereby the waste-valve has a tendency to seat.

On the bottom of boxing 3 is an upright 15, to which is pivoted a lever 16, pivoted at 17 to waste-valve stem 11. Rising from the bottom of boxing 3 is another standard 18, to which is pivoted a lever 19, connected by a link 20 to the end of the lever 16.

The numeral 21 designates the lower portion of the inlet-valve rod, and 22 is the inlet-valve adapted to fit seat 2. On the inlet-valve rod is an adjustable collar 23, adapted to engage the lower side of the projecting end of lever 19 when the inlet-valve is closed, as shown in Fig. 1, and thereby cause opening of the waste-valve. The upper or actuating section 24 of the inlet-valve rod is connected by a screw-threaded coupling 25 to the section 21 in a well-known manner, so that upon turning of the valve-rod section 24 the valve-rod section 21 will be raised or lowered, said section 21 being held from rotation by working in guides 26.

The parts are normally in position shown in Fig. 1, where the collar 23 through the system of levers holds the waste-valve 12 open against the tension of its spring 13, in consequence of which any contained water in the fire-plug casing will drain out through the drain-pipe 5 and into the cesspool 4, from which it will gradually soak into the earth; but upon opening of the inlet-valve, as shown in Fig. 2, the lever 19 will be released from the collar 23, and the spring 13 will thereupon seat the waste-valve 12, so that the water flowing into the plug will not be diverted into the cesspool.

Having thus described my invention, what I claim as new, and desire to secure by Letters Patent, is—

An antifreezing fire-plug comprising the combination of a valve-casing having a main or supply valve seat, a valve adapted to close on said seat, a valve-stem for said valve having a collar, a removable waste-valve seat on the casing, said seat having a web or guide, a waste-valve having its stem slidable through the guide, a spring and adjustable nut on the waste-valve stem on the opposite side of the guide from the waste-valve and adapted to close the waste-valve, a pivotally-supported lever pivoted to the waste-valve stem, and a pivotally-supported lever pivotally connected to the lever aforesaid and having a free end positioned to be engaged by the collar when the main valve is closed, whereby the waste-valve is opened on the closing of the main valve and closed on the opening of the main valve.

In testimony whereof I hereunto affix my signature in presence of two witnesses.

JOHN F. KEHR.

Witnesses:
J. L. CONARD,
JOHN WAGNER.